US008566720B2

(12) United States Patent
Tuli

(10) Patent No.: US 8,566,720 B2
(45) Date of Patent: *Oct. 22, 2013

(54) SYSTEM AND METHOD FOR LISTENING TO AUDIO CONTENT

(75) Inventor: Apaar Tuli, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,457

(22) Filed: May 29, 2012

(65) Prior Publication Data

US 2012/0240046 A1 Sep. 20, 2012

Related U.S. Application Data

(63) Continuation of application No. 11/923,994, filed on Oct. 25, 2007, now Pat. No. 8,190,994.

(51) Int. Cl.
*G06F 3/048* (2013.01)

(52) U.S. Cl.
USPC ........... 715/716; 715/835; 715/810; 715/977; 725/37; 345/473

(58) Field of Classification Search
USPC ......... 715/716, 719, 733, 764, 765, 810, 835, 715/838, 864, 977; 725/37–39, 86, 87; 345/473, 169
See application file for complete search history.

(56) References Cited

U.S. PATENT DOCUMENTS

| 5,524,195 | A | 6/1996 | Clanton et al. |
| 5,630,081 | A | 5/1997 | Rybicki et al. |
| 6,104,397 | A | 8/2000 | Ryan et al. |
| 6,762,773 | B2 | 7/2004 | Kolde et al. |
| 6,766,376 | B2 | 7/2004 | Price |
| 7,055,104 | B1 | 5/2006 | Billmaier et al. |
| 7,073,193 | B2 | 7/2006 | Marsh |
| 7,747,968 | B2 | 6/2010 | Brodersen et al. |
| 7,761,812 | B2 | 7/2010 | Ostojic et al. |
| 2002/0169892 | A1 | 11/2002 | Miyaoku et al. |
| 2004/0070593 | A1 | 4/2004 | Neely et al. |
| 2004/0168184 | A1 | 8/2004 | Steenkamp et al. |
| 2004/0244037 | A1 | 12/2004 | Yamaguchi et al. |
| 2005/0134578 | A1 | 6/2005 | Chambers et al. |
| 2005/0166153 | A1 | 7/2005 | Eytchison et al. |
| 2005/0271070 | A1 | 12/2005 | Mikami et al. |
| 2006/0008256 | A1 | 1/2006 | Khedouri et al. |
| 2006/0020971 | A1 | 1/2006 | Poslinski |
| 2006/0064716 | A1 | 3/2006 | Sull et al. |
| 2006/0204215 | A1 | 9/2006 | Van Der Brug |
| 2007/0083911 | A1 | 4/2007 | Madden et al. |
| 2007/0192750 | A1 | 8/2007 | Lee et al. |

(Continued)

FOREIGN PATENT DOCUMENTS

| WO | WO-2005/006685 A1 | 1/2005 |
| WO | WO 2006/072909 A | 7/2006 |

OTHER PUBLICATIONS

International Search Report and Written Opinion for PCT/IB2008/002846 mailed May 11, 2009.

(Continued)

*Primary Examiner* — Xiomar L Bautista
(74) *Attorney, Agent, or Firm* — Alston & Bird LLP

(57) ABSTRACT

A method including selecting a presentation content group, displaying content identifiers corresponding to the presentation content group, selecting a content identifier, and instantly presenting a substantially live presentation content from a media provider corresponding to the selected content identifier to a user.

20 Claims, 18 Drawing Sheets

(56) References Cited

U.S. PATENT DOCUMENTS

2007/0240185 A1 10/2007 Weaver
2008/0046117 A1 2/2008 Koo et al.
2008/0086456 A1 4/2008 Rasanen et al.
2008/0111822 A1 5/2008 Horowitz et al.
2008/0155458 A1 6/2008 Fagans et al.
2008/0276278 A1 11/2008 Krieger et al.
2008/0307332 A1 12/2008 Hayles et al.
2011/0126135 A1 5/2011 Chambers et al.

OTHER PUBLICATIONS

Sivagurunathan, S.K. et al., *Multimedia Over Wireless Networks*, [Retrieved Aug. 29, 2013] Retrieved from: <URL: http://cs.ou.edu/~netlab/TR/Multimedia-bookchap-TNRL-06-105.pdf>.

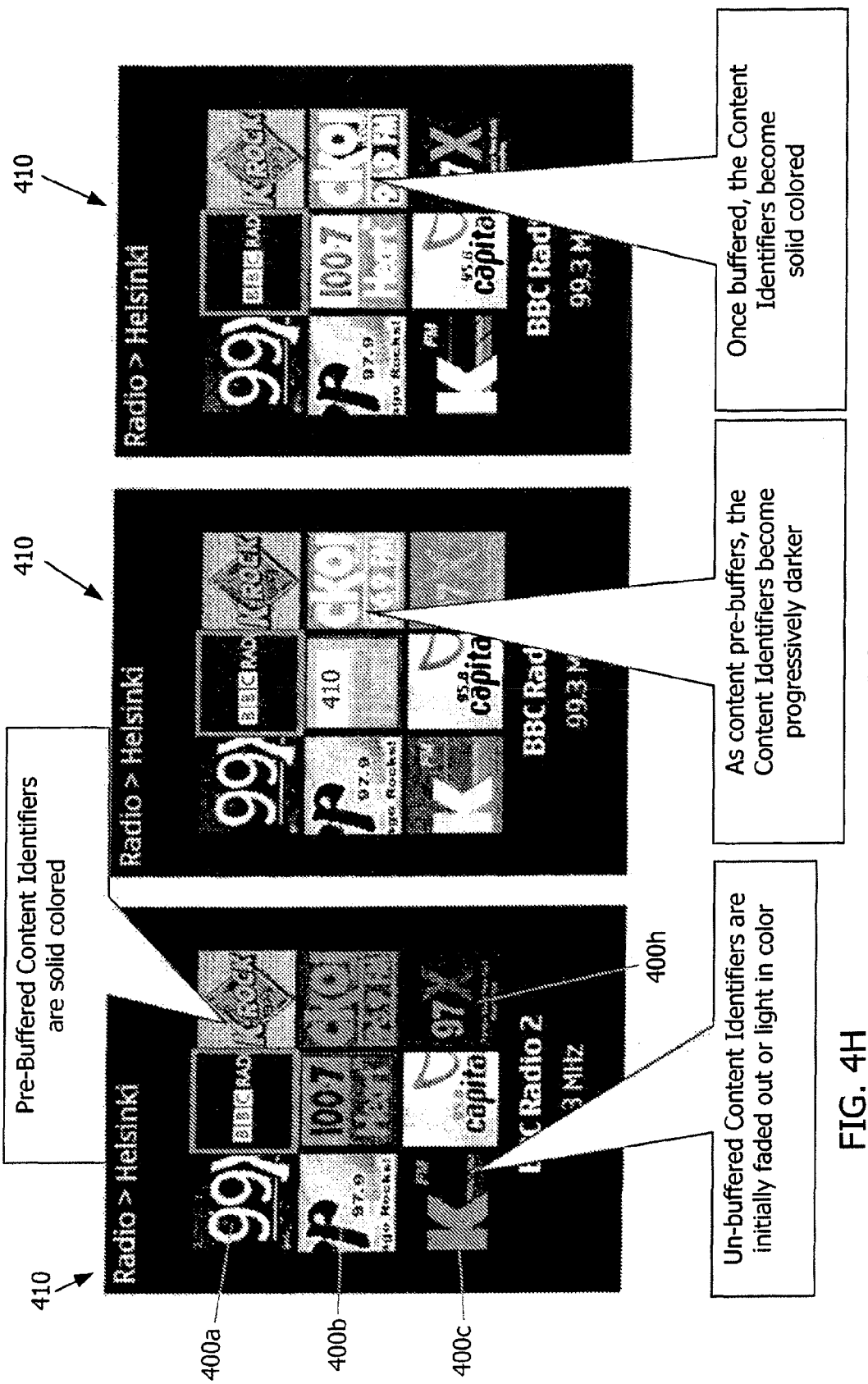

SYSTEM AND METHOD FOR LISTENING TO AUDIO CONTENT

CROSS REFERENCE TO RELATED APPLICATION

This application is a continuation of and claims priority to U.S. application Ser. No. 11/923,994, filed on Oct. 25, 2007, the entire contents of which are hereby incorporated by reference.

BACKGROUND

1. Field

The disclosed embodiments generally relate to user interfaces and, more particularly, to interfaces for playing presentation content.

2. Brief Description of Related Developments

Generally when a user searches for live audio content such as, for example, internet or over the air radio stations, the selection of the audio content is a slow going process. The audio content is generally presented to the user in a list form or is presented station by station such that the user can scroll through the stations.

For example, in the case of over the air radio broadcasts one station identifier may be presented on a display of a device such that as the user operates an input of the device the display may present another station identifier, where the station identifiers are presented one at a time (e.g. scrolling through the radio stations one at a time). The station identifiers are generally presented in ascending or descending numerical order. Changing from one radio station to another can be tedious when the radio stations are located on, for example, opposite ends of the frequency spectrum. Radio presets that are programmed by a user to be associated with particular radio stations can also be used to select radio stations. However, the preset radio stations are also generally displayed in a user defined list that allows a user to scroll through the preset stations.

In another example, in the case of Internet radio broadcasts, the internet radio station identifiers are generally presented in a list form. A browsing the Internet radio stations generally cannot listen to or sample the audio content playing on the internet radio station without selecting the station and waiting for the audio content to buffer in a memory of the device. Buffering each station as it is selected is slow and breaks up the flow of sampling different Internet audio content.

It would be advantageous to be able to sample different audio content in a quick and intuitive manner.

SUMMARY

In one aspect, the disclosed embodiments are directed to a method. In one embodiment the method includes selecting a presentation content group, displaying content identifiers corresponding to the presentation content group, selecting a content identifier, and instantly presenting a substantially live presentation content from a media provider corresponding to the selected content identifier to a user.

In another aspect, the disclosed embodiments are directed to an apparatus. In one embodiment the apparatus includes a processor and a display connected to the processor, wherein the processor is configured to select a presentation content group, present content identifiers corresponding to the presentation content group on the display, select a content identifier and instantly present a substantially live presentation content from a media provider corresponding to the selected content identifier to a user.

In yet another aspect, the disclosed embodiments are directed to a computer program product embodied in a memory of a device. In one embodiment the computer program product includes computer readable code embodied in a computer readable medium for executing the method described in the claims.

In still another aspect, the disclosed embodiments are directed to system. In one embodiment the system includes an input configured to cause a selection of a presentation content group and a selection of a media provider, a display configured to display content identifiers corresponding to media providers of the selected presentation content group and a processor connected to the input and display, the processor being configured to instantly present a substantially live presentation content from the selected media provider to a user upon selection of a corresponding content identifier.

In another aspect, the disclosed embodiments are directed to a user interface. The user interface includes an input configured to cause a selection of a presentation content group and a selection of a media provider, a display configured to display content identifiers corresponding to media providers of the selected presentation content group and a processor connected to the input and display, the processor being configured to instantly present a substantially live presentation content from the selected media provider to a user upon selection of a corresponding content identifier.

BRIEF DESCRIPTION OF THE DRAWINGS

The foregoing aspects and other features of the embodiments are explained in the following description, taken in connection with the accompanying drawings, wherein:

FIG. 4A-4J are illustrations of exemplary screen shots of a user interface in accordance with an aspect of the disclosed embodiments;

DETAILED DESCRIPTION OF THE EMBODIMENT(S)

Figure 1:
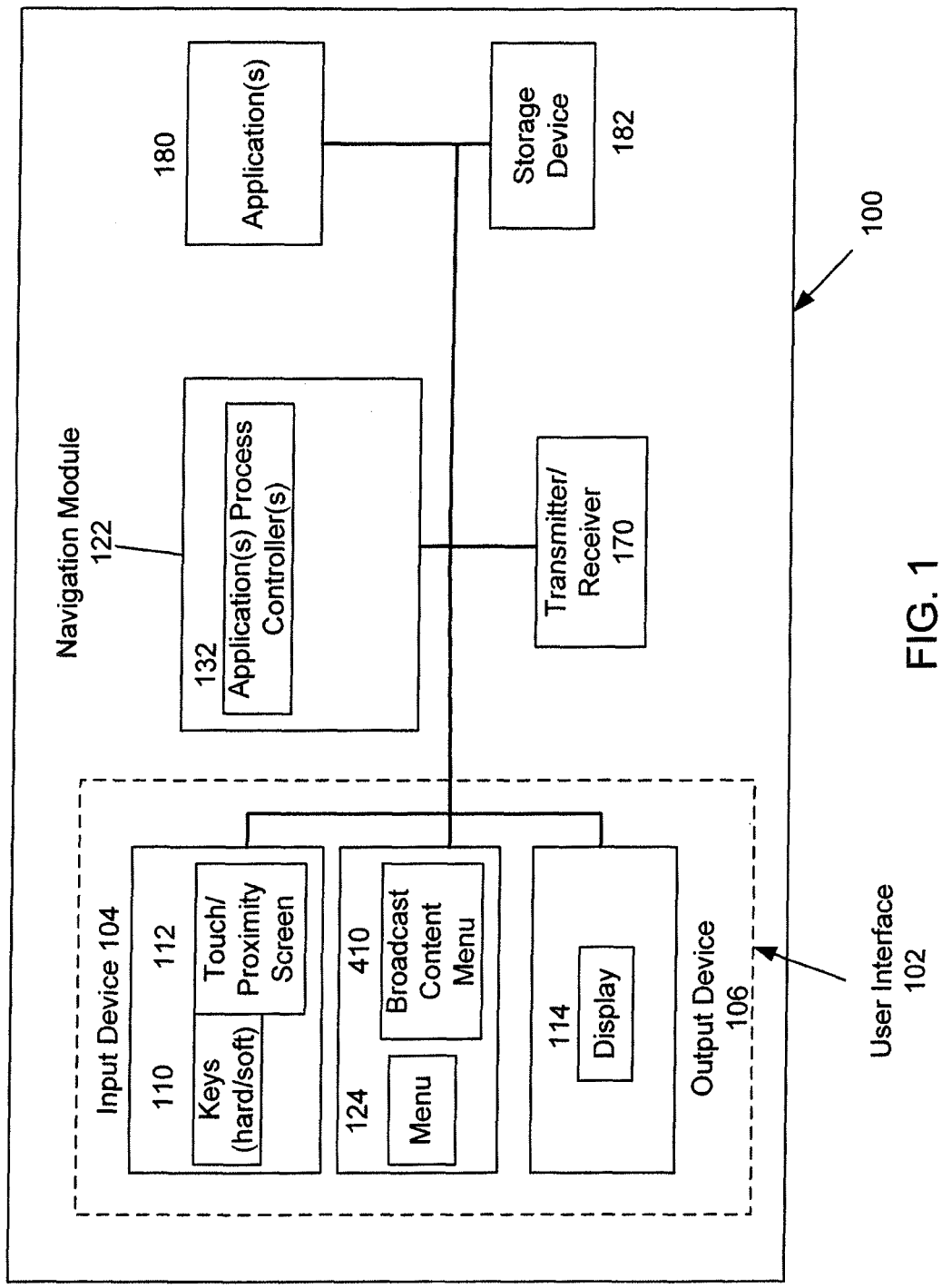
FIG. 1 shows a block diagram of a system in which aspects of the disclosed embodiments may be applied.
Figure 2:
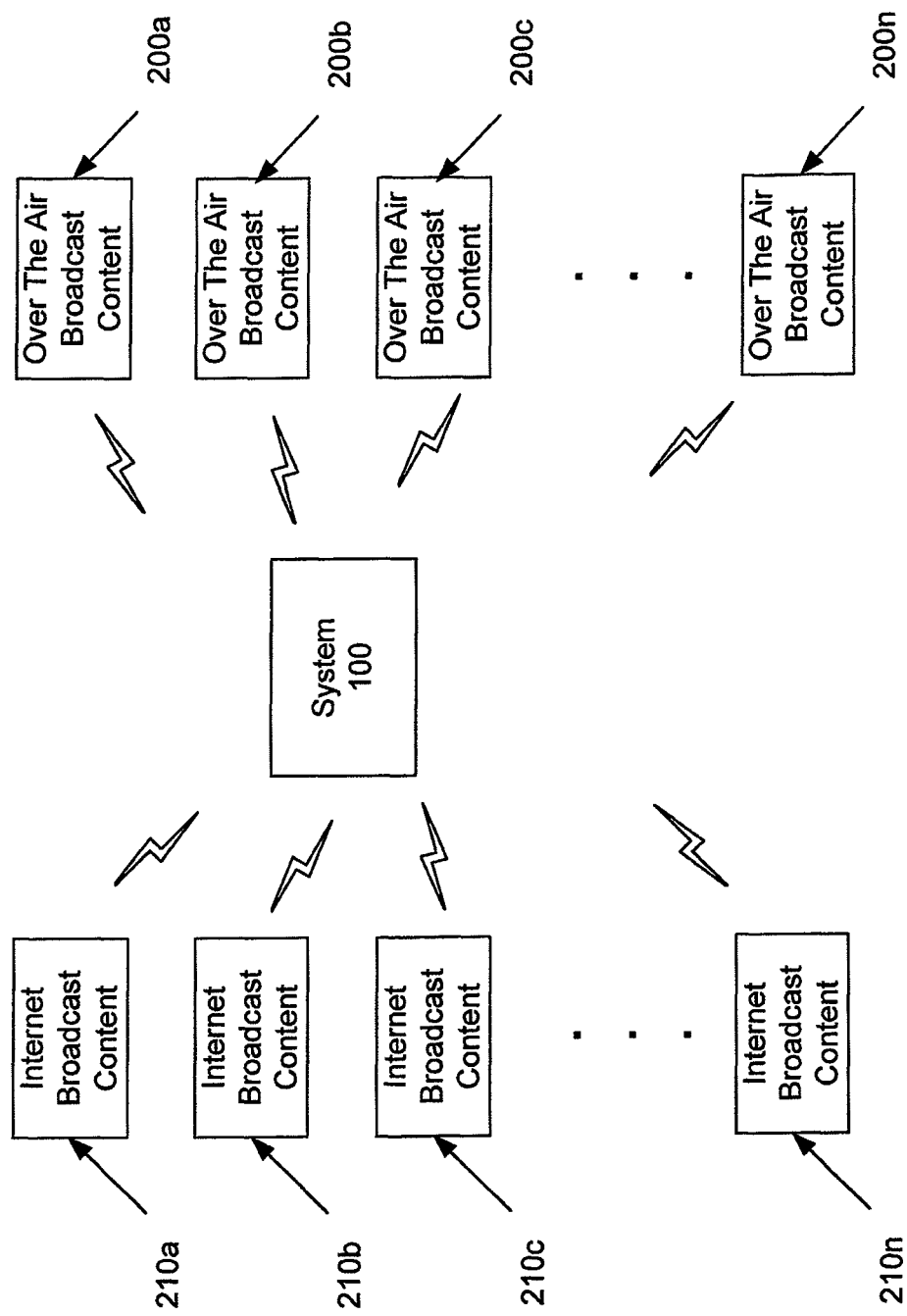
FIG. 2 is an illustration of an exemplary environment in which aspects of the disclosed embodiments may be applied.

FIG. 1 illustrates one embodiment of a system 100 in which aspects of the disclosed embodiments can be used. Although aspects of the disclosed embodiments will be described with reference to the embodiments shown in the drawings and described below, it should be understood that these aspects could be embodied in many alternate forms. In addition, any suitable size, shape or type of elements or materials could be used.

The disclosed embodiments generally allow a user of a device or system, such as the system 100 shown in FIG. 1 to quickly and intuitively sample any presentation content that is received in a device. The presentation content may be any suitable content that may be broadcast to the device, buffered in the device or obtained by the device ("pre-fetched") prior to its presentation to a user (collectively referred to as "presentation content"). The presentation content may include, but is not limited to analog or digital presentation content that may be obtained from any suitable media provider. The media providers may include, but are not limited to, live audio and/or video broadcasts from, for example, over the air radio or television stations 200a-200n or internet radio stations 210a-210n or audio/video content available over the Internet or through a wired or wireless network. For exemplary purposes only, the over the air audio content from, for example, radio and television stations may include any suitable frequencies (e.g. amplitude modulation (AM), frequency modulation (FM), very high frequency (VHF) and ultra high frequency (UHF) signals). Also for exemplary purposes, digital video broadcasts may be sent/received in the system 100 using any suitable protocols including, but not limited to, digital video broadcast-handheld (DVB-H), digital video broadcast-terestrial (DVB-T), digital video broadcast-satellite to handheld (DVB-SH) and digital video broadcast-multipoint video distribution systems (DVB-MDS). However, the disclosed embodiments are not intended to be limited to radio and/or television presentation content such that any suitable audio or video content may be presented in a manner substantially similar to that described below. In other embodiments, the disclosed embodiments may be applied to any suitable media players including, but not limited to, music players, video players and podcast players. The disclosed embodiments allow for the presentation of one or more content identifiers on a display in a manner that enables the user to quickly select a media provider (e.g. radio, television, etc.). The disclosed embodiments also provide for quick sampling of Internet based presentation content while minimizing the buffering time of the Internet presentation content that is experienced by the user (e.g. buffering of the Internet broadcasts is transparent to the user when sampling the broadcasts).

In one embodiment, referring to FIG. 1, the system can include an input device 104, output device 106, navigation module 122, applications area 180, storage/memory device 182 and a transmitter and/or receiver 170. The transmitter and/or receiver 170 may be configured for reception of analog or digital over the air transmissions and/or content transmitted or received over the Internet through one or more of a wireless or wired connection. The components described herein are merely exemplary and are not intended to encompass all components that can be included in the system 100. For example, in one embodiment, the system 100 comprises a mobile communication device or other such internet and application enabled devices. In one embodiment the applications of the device may include, but are not limited to, data acquisition (e.g. image, video and sound) and multimedia players (e.g. video and music players). Thus, in alternate embodiments, the system 100 can include other suitable devices and applications for monitoring application content and acquiring data and providing communication capabilities in such a device. While the input device 104 and output device 106 are shown as separate devices, in one embodiment, the input device 104 and output device 106 can be part of, and form, the user interface 102. The user interface 102 can be used to display information pertaining to over the air or Internet broadcasts as will be described below.

In one embodiment, the user interface of the disclosed embodiments can be implemented on or in a device that includes a touch screen display or a proximity screen device. In alternate embodiments, the aspects of the user interface disclosed herein could be embodied on any suitable device that will display information and allow the selection and activation of applications or system content. The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to encompass that a user only needs to be within the proximity of the device to carry out the desired function. For example, the term "touch" in the context of a proximity screen device, does not imply direct contact, but rather near or close contact, that activates the proximity device.

Similarly, the scope of the intended devices is not limited to single touch or contact devices. Multi-touch devices, where contact by one or more fingers or other pointing devices can navigate on and about the screen are also intended to be encompassed by the disclosed embodiments. Non-touch devices are also intended to be encompassed by the disclosed embodiments. Non-touch devices include, but are not limited to, devices without touch or proximity screens, where navigation on the display is performed through, for example, keys 110 of the system or through voice commands via voice recognition features of the system.

Figure 3:
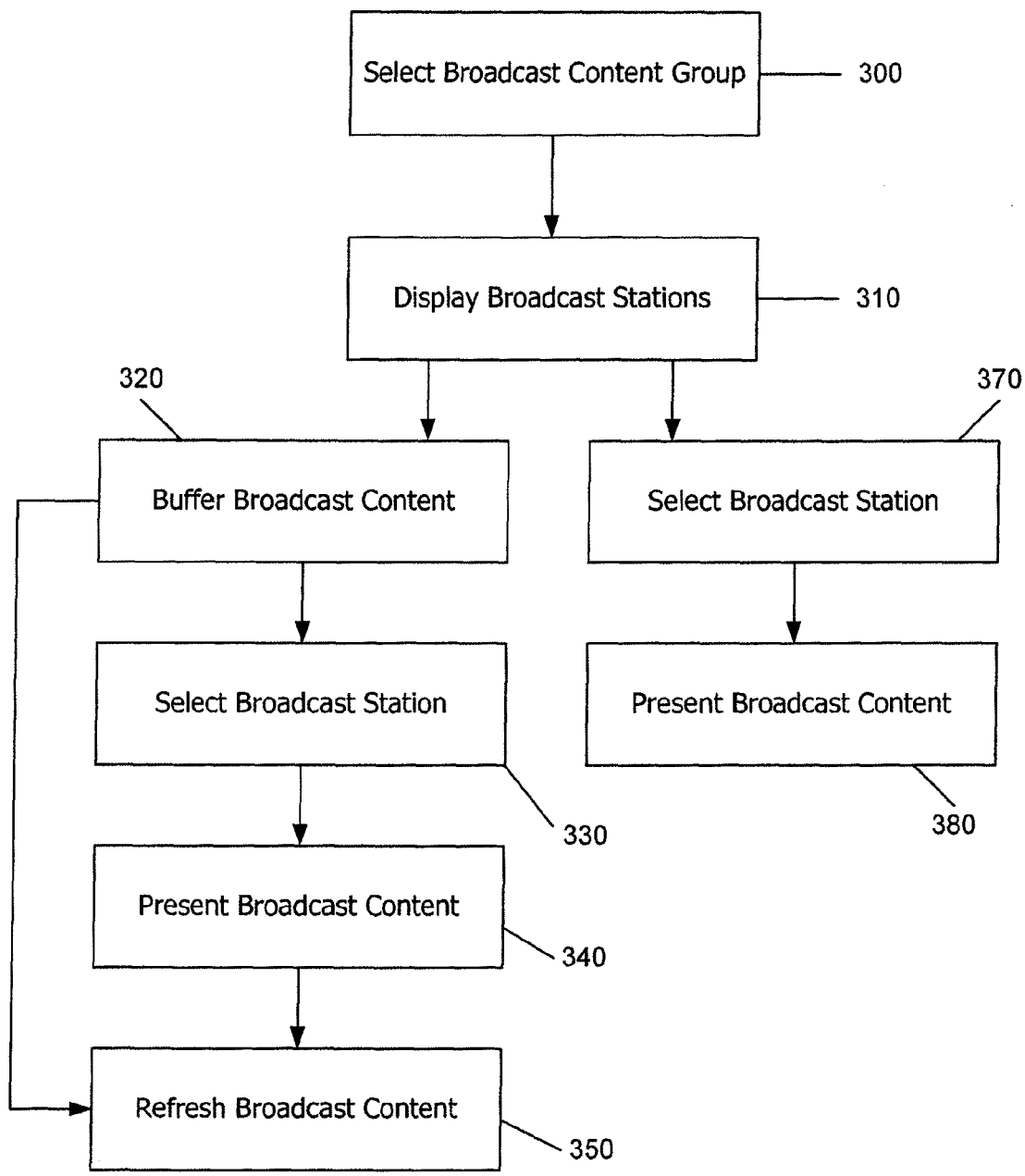
FIG. 3 is a flow chart illustrating one example of a process according to the disclosed embodiments.

Referring also to FIG. 3, a flow chart illustrating one example of a process according to the disclosed embodiments is shown. In one example, a user of the system 100 selects a presentation content group for presentation on the display 114 (FIG. 3, Block 300). Any suitable number of presentation content groups may be available to the user. In one example, the presentation content groups can be presented such that the presentation content is grouped by geographical area, by genre, or by user defined groupings. As a non-limiting example, there may be one presentation content group for rock music, one broadcast group for jazz music, one broadcast group for radio stations in the city of Helsinki, Finland, one broadcast group for available television broadcasts, etc. In other embodiments, the presentation content may be grouped together in any suitable manner. In one embodiment the presentation content groups may have separate groupings for over the air broadcast and internet broadcasts while in other embodiments internet and over the air broadcasts may be intermixed within one or more of the presentation content groups. For example, one group may include Internet based radio stations, another group may include over the air based radio stations and a third group may include a mixture of Internet and over the air radio stations.

Figures 3A, 3B, 3C, 3D:
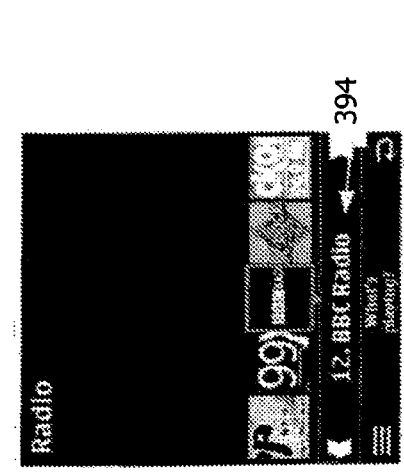
FIG. 3A-3H are illustrations of exemplary screen shots of a user interface in accordance with the disclosed embodiments.

The presentation content groups may be presented to the user in any suitable manner including, but not limited to, any suitable menu of the system 100. For example, menus of multimedia player applications (e.g. audio and/or video player applications) of the system 100 may be configured to present the presentation content groups for selection by a user. The user may select a presentation content group from, for example, any suitable menu in any suitable manner including, but not limited, hard or soft keys 110 or by selecting an area of a touch or proximity screen 112 (FIG. 3, Block 310). In one embodiment, referring to FIGS. 3A-3D when the user selects a presentation content group, the content identifiers 391 may be presented to the user in an animated manner. For example, FIGS. 3A-3D illustrate content identifiers "sliding" or scrolling towards the top of the display over a predetermined time period. For exemplary purposes only the time line 395 is shown such that at least one line of content identifiers slides into view over a period of, for example 0.5 seconds. In other embodiments the time period may be more or less than 0.5 seconds. In this example, the display includes a media provider section 390 that indicated the currently selected media provider which in FIG. 3A is "Jacaranda". As the user switches from one media provider to another a newly selected media provider 392 may be highlighted as described herein in the list of media providers 391. The identification 394 of the newly selected media provider may scroll or "slide" into the section 390 while the old media provider's identification slides out of the section 390. In this example the media provider identification 394 is shown as moving from right to left but in other embodiments the media provider identifiers may move in any suitable direction. In other embodiments the changing of the media provider identifications in section 390 can occur in any suitable manner including, but not limited to, fading in/out.

Figures 3E, 3F, 3G, 3H:
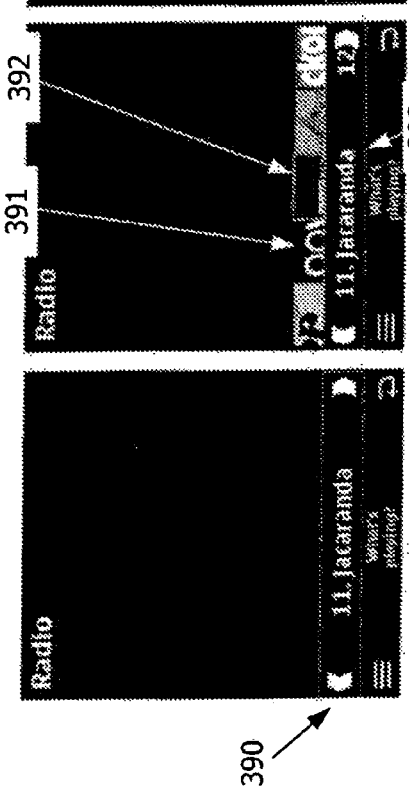

As can be seen in FIGS. 3E-3H the content identifiers 396 may also appear in a list form such that it appears the system 100 is searching or scanning for the content identifiers 396. In this example, a bar 397 of, for example white noise is presented in the list of content identifiers. As shown in FIGS. 3E-3G a content identifier 398 may gradually appear in the bar 397. When the content identifier 398 is fully displayed the bar may move to the next line of the list as shown in FIG. 3H for the presentation of another content identifier in a manner substantially similar to that described above with respect to FIGS. 3A-3G. In other embodiments the content identifiers may be presented to the user in any suitable manner (e.g. with or without animations) and in any suitable configuration.

Figure 4B:
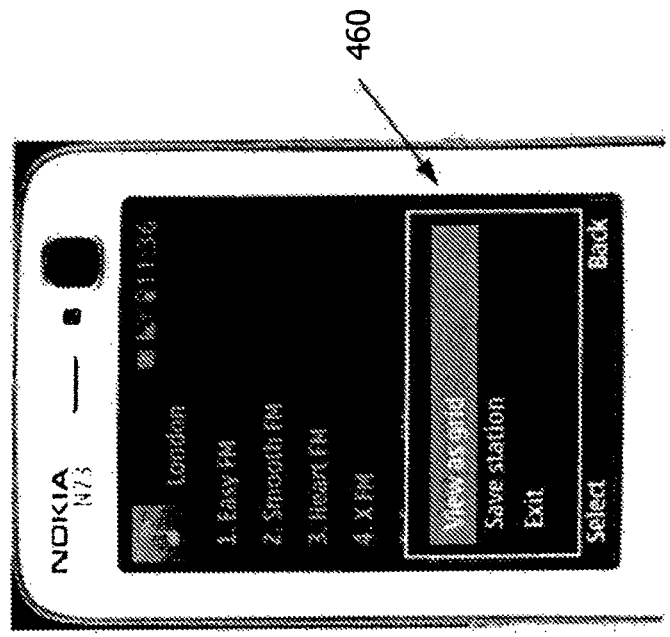
Figure 4A:
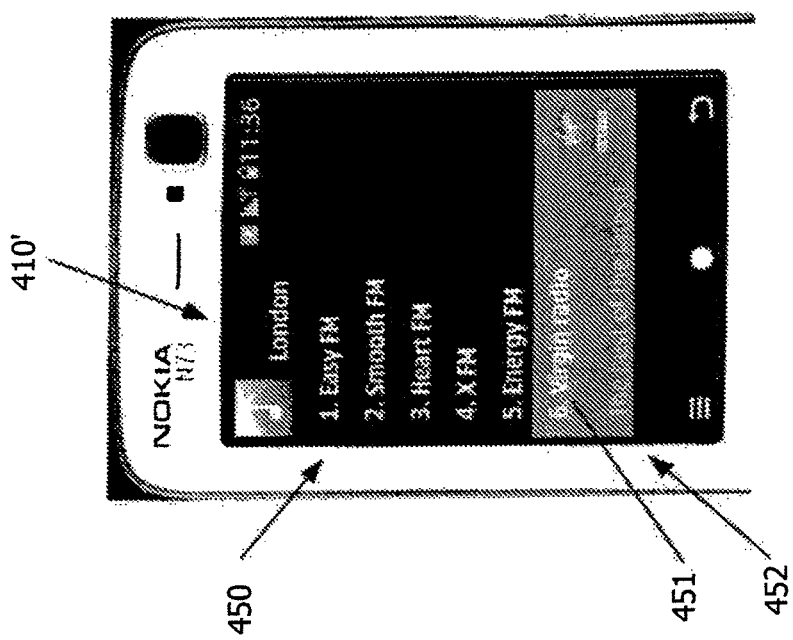
Figure 4C:
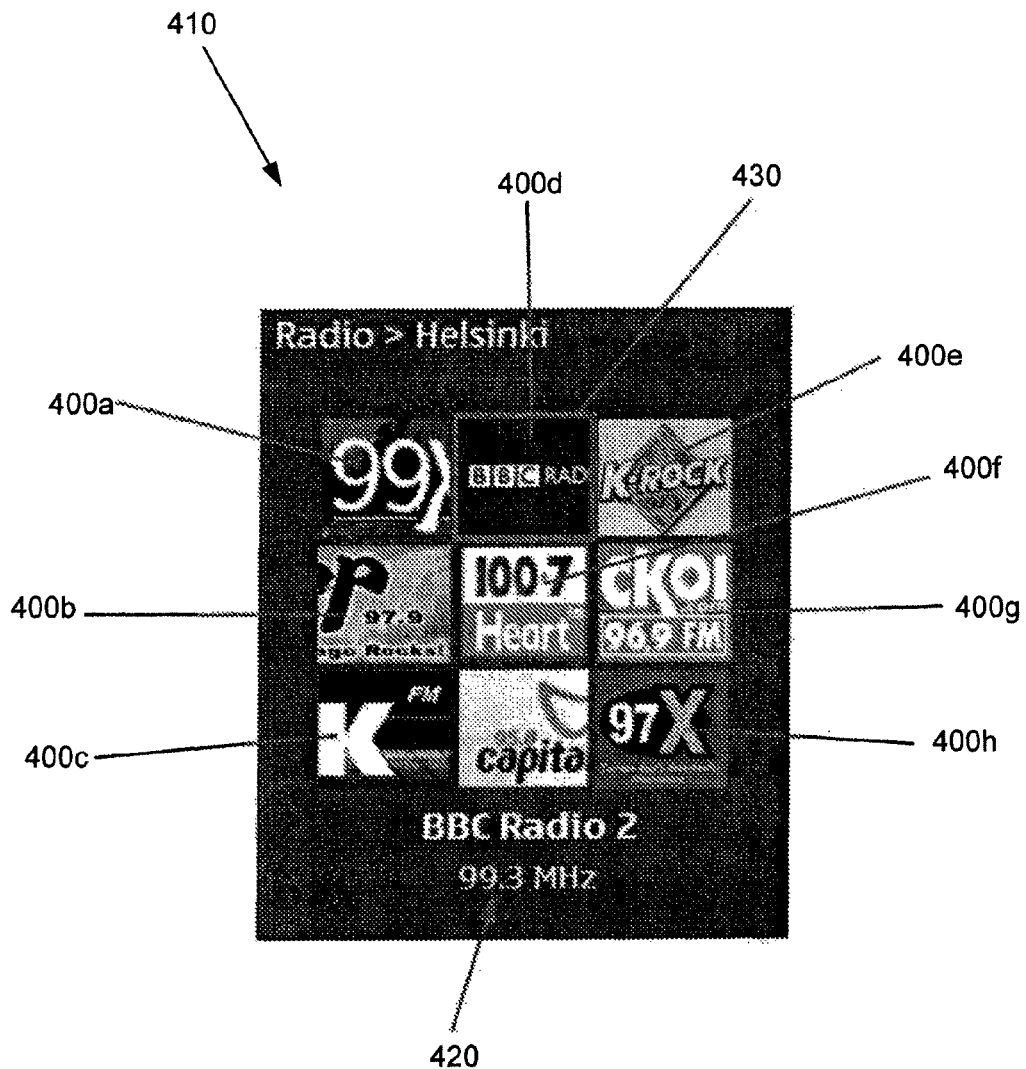

Referring now to FIG. 4A-4C the content identifiers 450 may be presented to the user in a list configuration 410' as shown in FIG. 4A or in a grid configuration 410 as shown in FIG. 4C. In other embodiments the content identifiers may have any suitable configuration on the display. The system 100 may provide a menu 460 for switching between the list and grid configurations as shown in FIG. 460. It is noted that the menu is not limited to what is shown in FIG. 4B and that the menu may have any suitable configuration. For exemplary purposes only, in the examples described below the content identifiers will be described with respect to the grid configuration shown in FIG. 4C but the examples below apply equally to the list configuration of FIG. 4A or any other suitable content identifier configuration.

Referring now to FIG. 4C, an exemplary presentation content menu or grouping 410 is presented on, for example the display 114 of the system 100. The presentation content menu 410 is presented in response to and depending on which presentation content group is selected. For exemplary purposes only, the selected presentation content group shown in FIG. 4C includes content identifiers 400a-400h. In this example the content identifiers are over the air radio station identifiers in the geographical location of Helsinki, Finland but in other examples the menu 410 and content identifiers 400a-400h may pertain to any suitable presentation content. It is noted that while the examples described herein are described with respect to radio stations, these examples apply equally to any of the presentation content described herein.

Figure 4D:
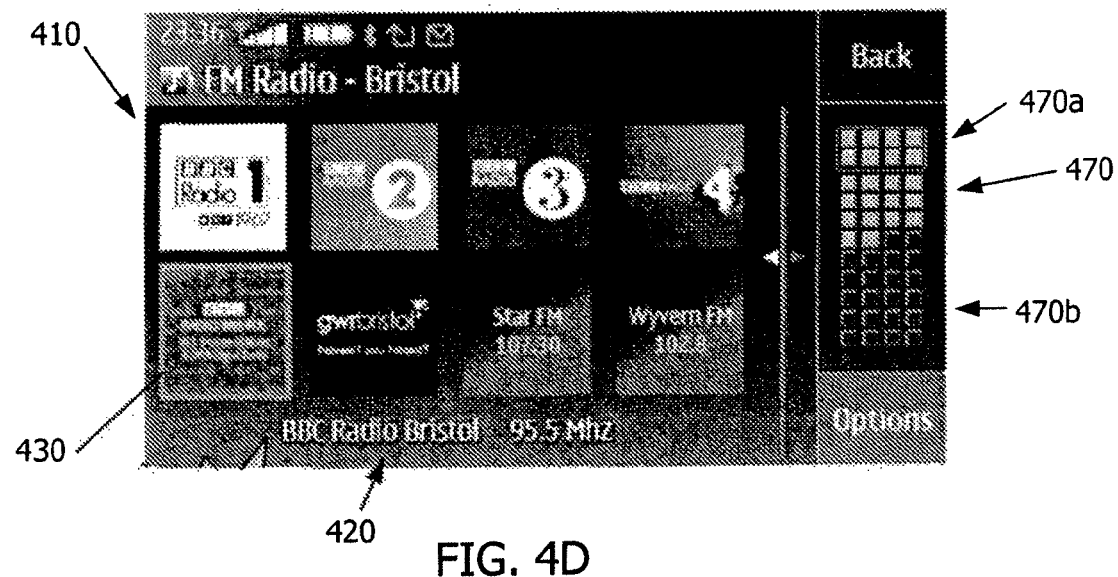

In this example, the grid can be variable in size (e.g. the number of rows and columns) depending on for example the available screen space on the display 114. In one embodiment, the content identifiers may be adjusted in size so that the entire grid is presented on display 114 without having to scroll the display screen (e.g. up/down or left/right) to view all of the identifiers. In other embodiments, the user may scroll the display screen for selection of a content identifier 400a-400h. For example, as can be seen in FIG. 4D a scroll indicator 470 may be presented on the display. The scroll indicator may include filled in blocks 470a corresponding to the content identifiers 400a-400h. The scroll indicator may also include empty blocks 470b corresponding to, for example, content identifiers that have not yet been buffered. In other embodiments the scroll indicator may have any suitable configuration for allowing a user to identify and scroll through display content. The user may select any suitable portion of the scroll indicator 470 such that the system 100 presents the corresponding identifiers 400a-400h on the display.

In this example, the content identifiers may be any suitable image, text or other indicator that identifies a corresponding radio station to the user. In the example shown in FIG. 4C, the identifiers 400a-400h are images of radio station logos. The content identifiers 400a-400h may be obtained in any suitable manner including, but not limited to, a back end server (which may be part of a wired or wireless network) that has a database or directory of, for example, radio stations, their frequencies and the identifiers associated with each of the radio stations and any other suitable metadata related to the radio stations. In alternate embodiments, the database may include any suitable information.

Figure 4E:
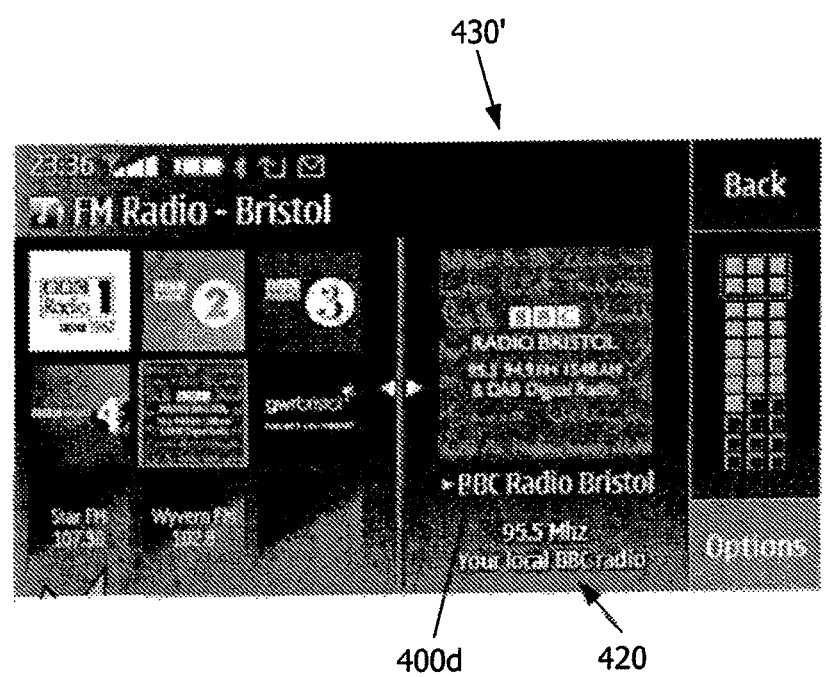
Figure 5:
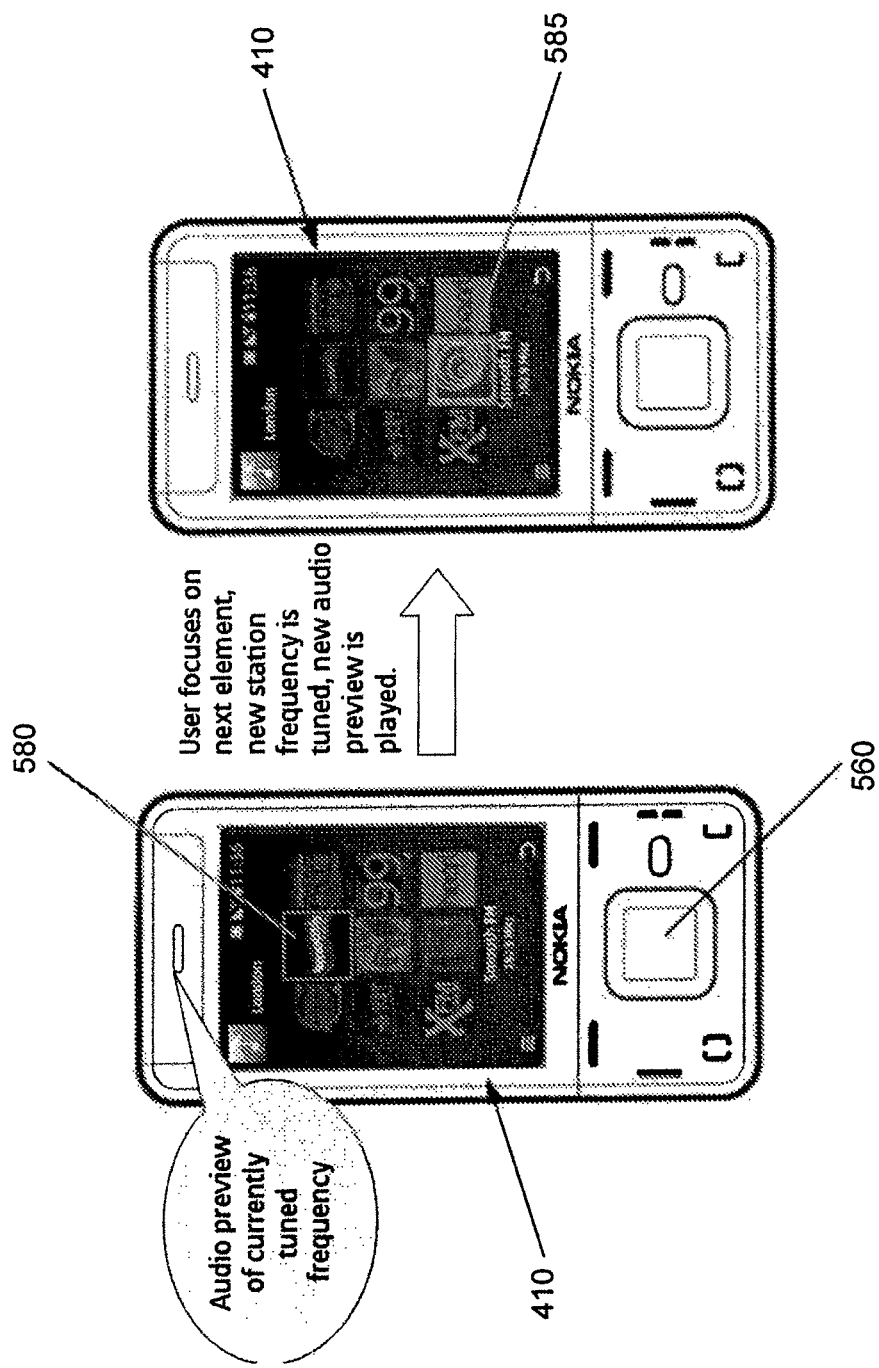
FIG. 5 illustrates an exemplary selection of audio content in a device in accordance with an aspect of the disclosed embodiments.

In this example, the user of the system 100 may sample one or more of the radio stations corresponding to content identifiers 400a-400h by selecting the radio station in any suitable manner (FIG. 3, Block 370). Activating or selecting a content identifier 400a-400h generally includes any suitable manner of selecting or activating the controls, including touching, pressing or moving the input device. When the input device 104 includes control 112, which in one embodiment can comprise a touch screen pad or proximity screen, user contact with the touch or proximity screen will provide the necessary input. In one example, the user may touch a desired station identifier, such as for example, identifier 400d on a touch/proximity screen 112 of the system 100. When the identifier is selected it may be highlighted, or otherwise indicated in any suitable manner, that the identifier has been selected. For example a selection identifier 430 may be presented to indicate the selected identifier such as identifier 400d. In another example, as can be seen in FIG. 4E when the identifier is selected it may be highlighted as shown in FIG. 4C and/or presented on a separate portion 430' of the display in any suitable manner. In the example shown in FIG. 4E the identifier 400d is enlarged and presented next to the presentation content menu 410. The selection identifier 430 and/or the enlarged identifier shown in FIG. 4E can be an animated identifier in that in one embodiment the animation may be synchronized (e.g. glowing and fading of the identifier) with, for example, a beat of musical content being presented by the system 100. In other embodiments the selection identifier 430 or separate portion 430' may have any suitable characteristics for indicating a selected content identifier 400a-400h. In one embodiment, where the input device 104 comprises control 110, which in one embodiment can comprise a device having a keypad, pressing a key can activate a function. In other embodiments, where the control 110 of input device 104 also includes a multifunction rocker style switch or joystick 560 as shown in FIG. 5, the switch 560 can be used to select the identifiers 400a-400h. In one example, the multifunction rocker key 560 allows a user to move the selection indicator 430 to a radio station identifier such as identifier 400d as can be seen in FIG. 5. In FIG. 5, the rocker key 560 may be used to move the selection identifier 430 from station identifier 580 to station identifier 585. In other, example, speech recognition may be used to select the station identifiers 400a-400h. In still another example, a scroll wheel or track ball device may be used to select the station identifiers 400a-400h.

Upon selection of the radio presentation content the system 100 instantly tunes in to the corresponding radio station frequency and presents the live broadcast from that radio station (FIG. 3, Block 380). In one embodiment when the content is presented to the user, the content identifier corresponding to the presented content may change in appearance to indicate the corresponding content is being presented. The system 100 tunes to the corresponding radio frequency in the background so that the tuning occurs transparently to the user. The system 100 may also disclose the radio station name and frequency 420 in any suitable area of the display 114 as can be seen in FIG. 4A, for example. As different content identifiers 400a-400h are selected the radio frequency is transparently re-tuned to the frequency of the selected station.

Figure 4F:
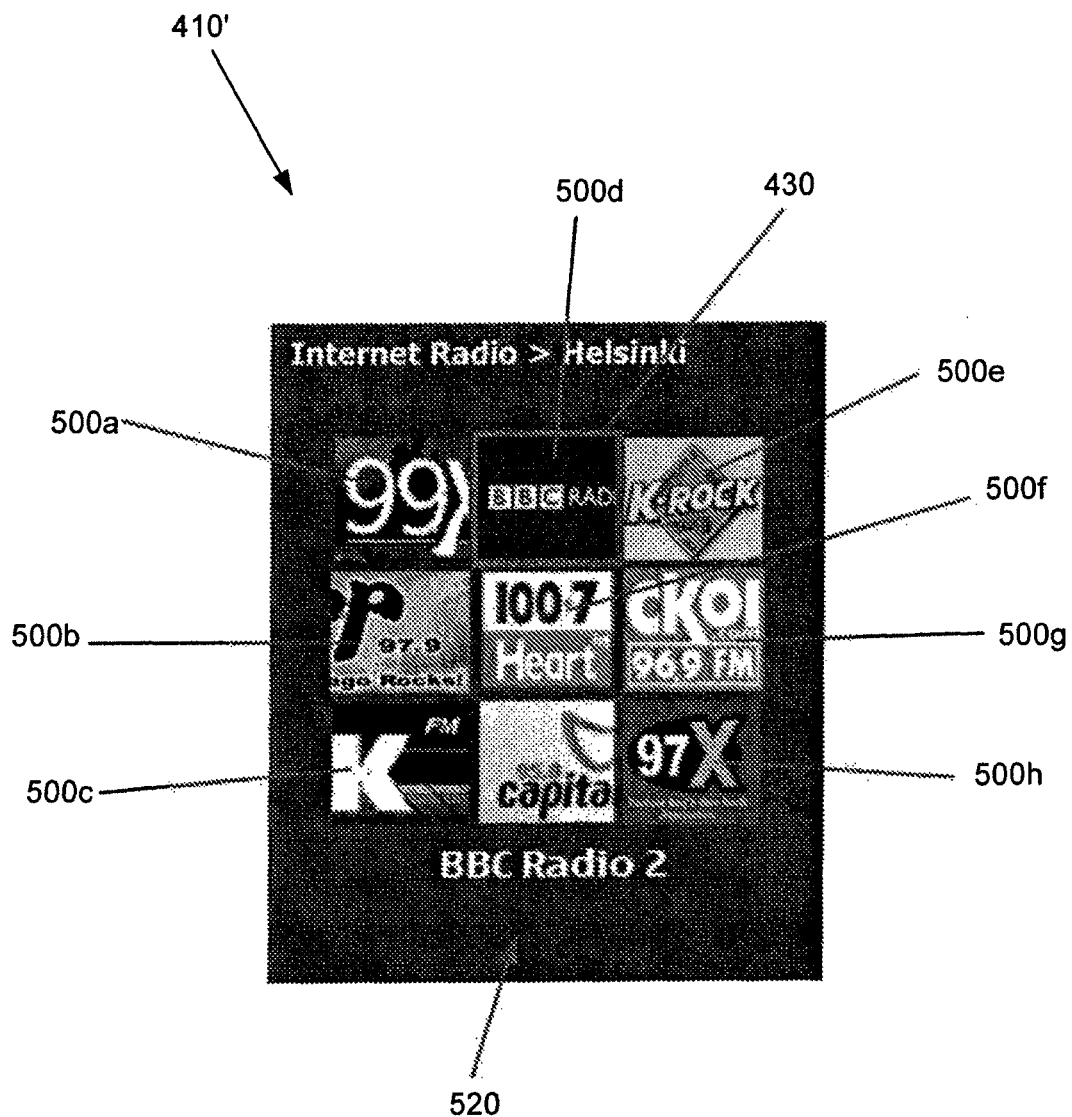
Figure 4G:
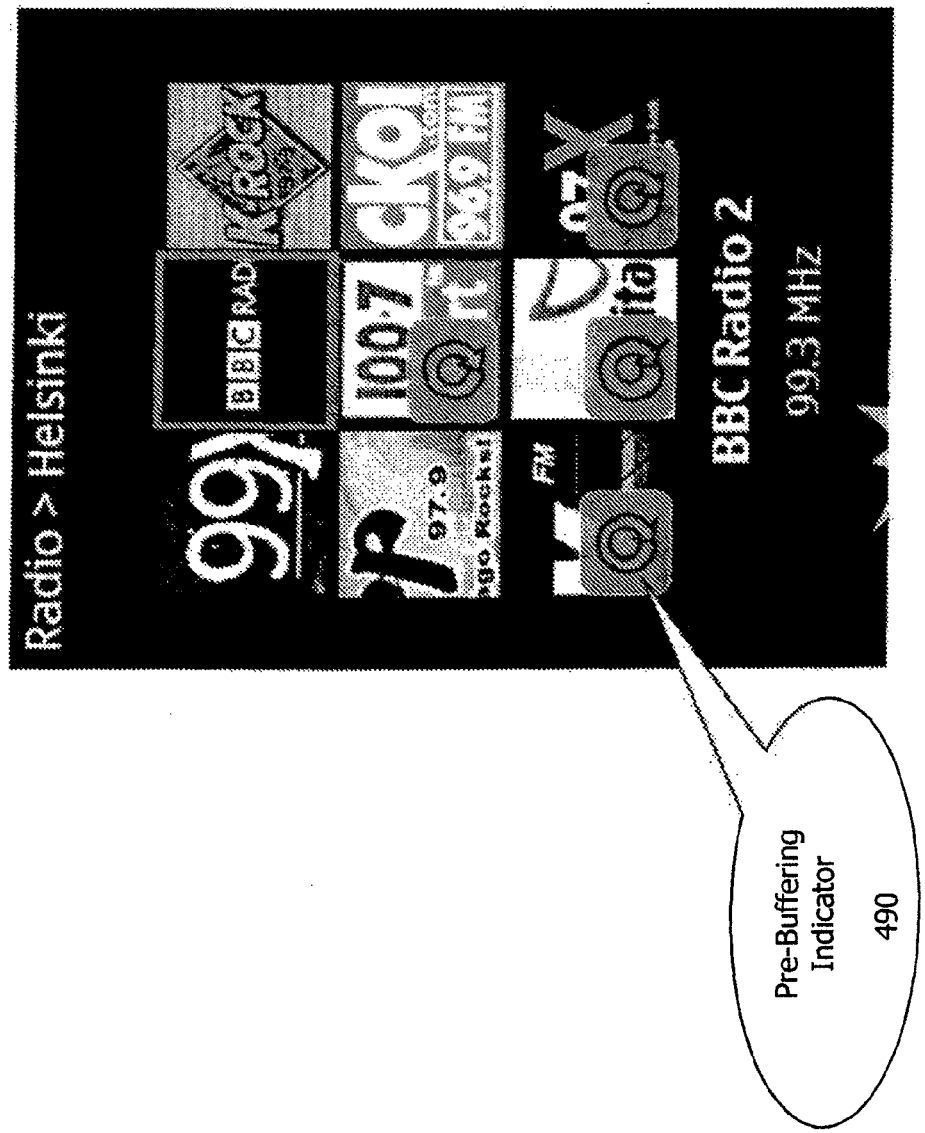

Referring now to FIG. 4F, and for exemplary purposes only, the presentation content menu 410' is configured so that content identifiers 500a-500h are arranged in a grid format. In other embodiments the content identifiers 500a-500h may be arranged in any suitable configuration including but not limited to the list format shown in FIG. 4A. In this example the content identifiers 500a-500h correspond to Internet radio stations but in other embodiments the identifiers may correspond to any suitable media content provider. The grid and selection of the presentation content menu and content identifiers may be substantially similar to that described above with respect to FIG. 4C. However, in this example when the presentation content menu 410' is selected the system 100 automatically connects to any suitable number of the internet radio stations identified in the grid and downloads or pre-buffers (e.g. buffers content before a respective station is selected for listening or previewing) a clip of the currently playing content on each of the Internet radio stations (FIG. 3, Block 320). For example, the system 100 may connect to three of the Internet radio stations at a time to pre-buffer the clips. In other examples, the system 100 may connect to more or less than three Internet radio stations to pre-buffer the clips. The pre-buffered clips of content may have any suitable length such as for example, fifteen seconds. In other embodiments the clip length may be more or less than fifteen seconds. In still other embodiments, the clip length may be set by a user of the system 100 in any suitable manner such as through a menu of the system 100. The clips are temporarily saved in a memory, such as memory 182. When the user selects one of the content identifiers (FIG. 3, Block 330), such as identifier 500d, the pre-buffered content is instantly presented by the system 100 to the user (FIG. 3, Block 340). If content has not been buffered when an identifier is selected a waiting to buffer indicator 490 as shown in FIG. 4G, such as an animation, image or message, is presented to the user while the buffering occurs. It is noted that the waiting to buffer indicator 490 may also be presented when the system 100 connects to a media provider before an identifier is selected such as when a presentation content group is selected for display. The waiting to buffer indicator 490 can be presented in any suitable area of the display 114 such as, for example, in or over the content identifier corresponding to the Internet radio station whose content is being buffered.

Figure 4K:
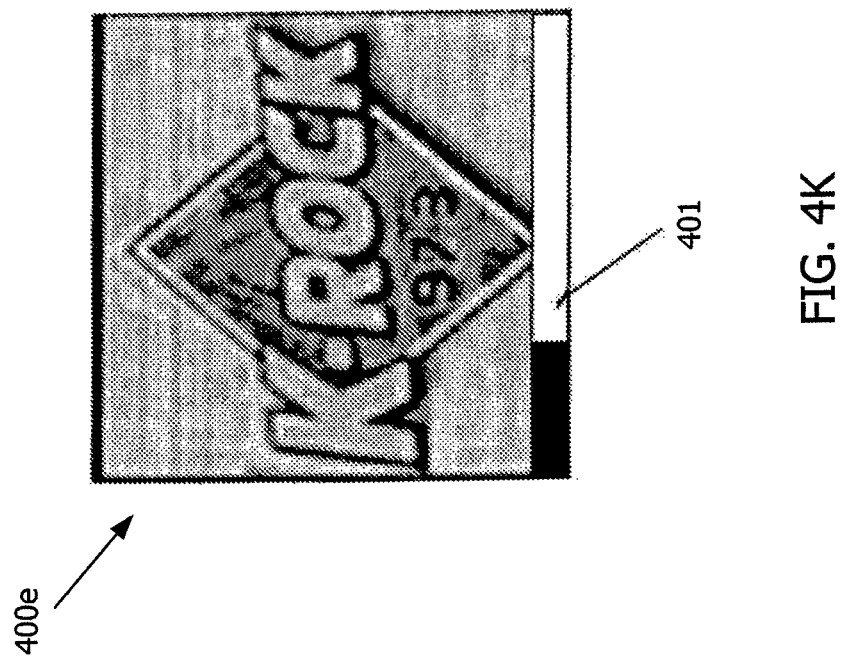
FIGS. 4K and 4L are illustrations of exemplary content identifiers in accordance with the disclosed embodiments.

In other embodiments the pre-buffered and waiting to buffer content identifiers may be differentiated in any suitable manner. For example, referring to FIGS. 4H-4J content identifiers, such as identifiers 400a, 400b, whose content is pre-buffered may have a darkened or solid colors or be opaque in appearance. Content identifiers whose content is not yet buffered, such as identifiers 400c, 400h may have a light, faded or translucent appearance. As the content of the identifiers is buffered the appearance of the respective content identifiers (see e.g. identifiers 400c, 400h in FIGS. 4I and 4J) becomes darker or more opaque. In another embodiment, Referring to FIG. 4K, a buffer progress bar 401 may be presented along, for example a bottom of a content identifier, such as identifier 400e. As the content of identifier 400e is buffered the progress bar may gradually darken or fill in. In other embodiments the progress bar may have any suitable positional relationship with its corresponding content identifier. In still other embodiments the buffering of preview content may be indicated to a user in any suitable manner.

Figure 4L:
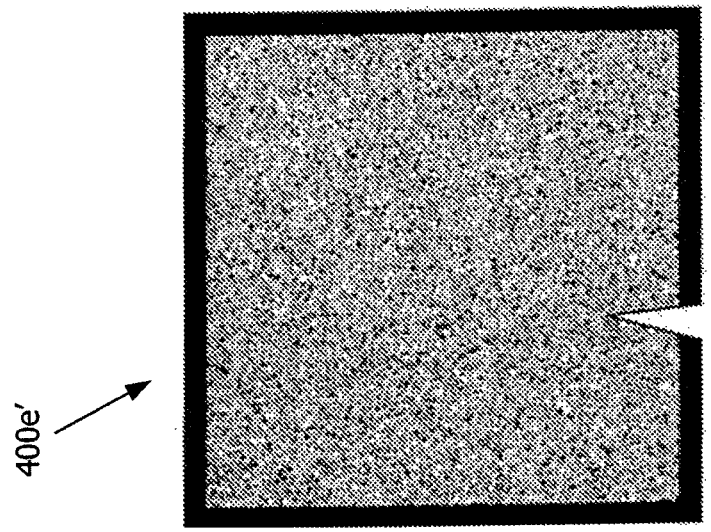
Figure 4L:
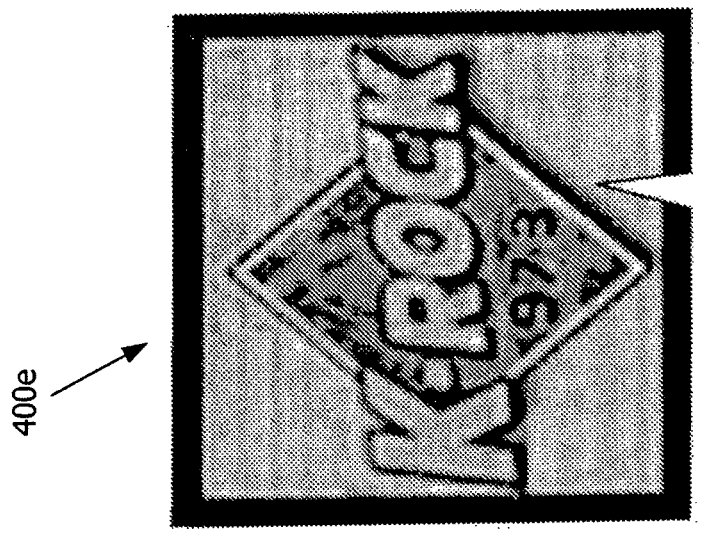

In one example, the sampling of Internet stations that are selected for use may have priority over other stations with respect to buffering their respective content. In other examples, the buffering of the Internet radio station content may occur simultaneously for any suitable number of the Internet radio stations using concurrent data connections to the Internet radio stations. In one example, as can be seen in FIG. 4L, if a selected content identifier, such as identifier 400e is selected but cannot be acquired (e.g. buffered or tuned) the content identifier may appear as "white noise" or static as shown in content identifier 400e'. In other embodiments any content identifier that cannot be buffered or tuned may appear as white noise. In still other embodiments any suitable indication that content identifiers cannot be buffered or tuned may be presented in any suitable positional relationship with a corresponding content identifier.

The clips of content (e.g. content previews) for the Internet radio stations, for example, may be refreshed after any suitable time period (FIG. 3, Block 350). For example, after two minutes the system 100 may reconnect to the Internet radio stations to download or buffer an updated content clip so that as the stations are sampled the user is kept apprised of what is currently playing on the selected stations. In other examples, the refresh period may be more or less than two minutes. In still other examples the user may select or set the refresh period in any suitable manner such as through a menu of the system 100. The refreshing of the Internet radio station content is automatic and transparent to the user. The pre-buffering of the content and the refreshing of the content allows for nearly live instantaneous sampling of the content being played on the Internet radio stations.

Figure 6:
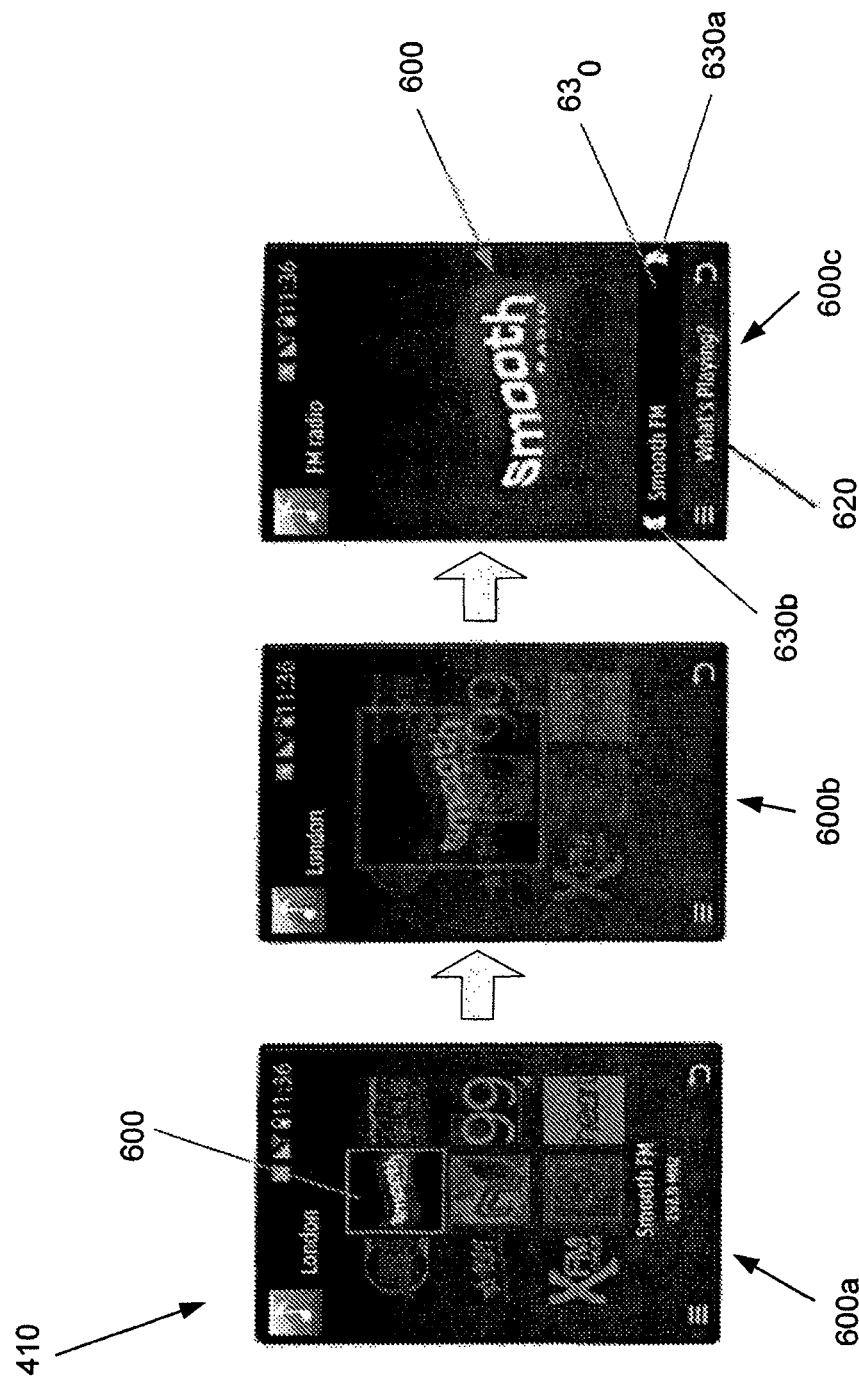
FIG. 6 is an illustration of an exemplary screen shot of a user interface in accordance with an aspect the disclosed embodiments.

Referring now to FIG. 6, three exemplary screen shots 600a-600c of the system 100 are shown. If a user selects a content identifier such as identifier 600 as shown in screen shot 600a and stays focused on, for example a station corresponding to that identifier for a predetermined amount of time (i.e. listens to the selected station without sampling other stations) the selected content identifier 600, for example, transitions in any suitable manner to a "now playing" view as seen in screen shot 600c. The predetermined time may be any suitable period of time. In one example the predetermined time period may be preset during manufacture of the system 100 (or preset during installation of suitable software). In other examples the predetermined time period may be user settable. In other embodiments the predetermined time period may be controlled by a backend server in or accessible to the system 100. In the now playing view the content identifier 600 substantially fills the display 114 of the system 100. In other examples the selected identifier 600 may transition to fill any suitable portion of the display 114. In this example the content identifier 600 is "zoomed" in to fill a portion of the display as can be seen in, for example, FIG. 6, but in other examples the content identifier can be presented in the now playing view in any suitable manner such as for example in a manner substantially similar to that shown in FIGS. 4D and 4E (e.g. the enlarged content identifier). User listening options are also presented in the now playing view shown in screen shot 600c. The user options may be any suitable options, including, but not limited to, play lists or content information 620 or a station selector 630. The play lists or content information 620 may include a description of, for example a song currently being played on the selected radio station and/or a list of songs previously played and/or a list of songs to be played. The station selector 630 may include, for example, navigation arrows 630a, 630b that can be activated by touching the arrow or using a rocker key such as key 560. In one example, activation of the navigation arrows 630a, 630b may return the user to the grid of station identifier of screen shot 600a. In other examples, the station selector 630 may be used to sample station content or change radio station without returning to the grid of station identifiers shown in screen shot 600a. It is noted that the user listening options shown in FIG. 6 are merely exemplary and that any suitable options can be presented to a user such as options including, but not limited to, changing presentation content menus (e.g. genres, geographical area, etc.), changing radio stations and options to purchase songs being played.

Figure 7A:
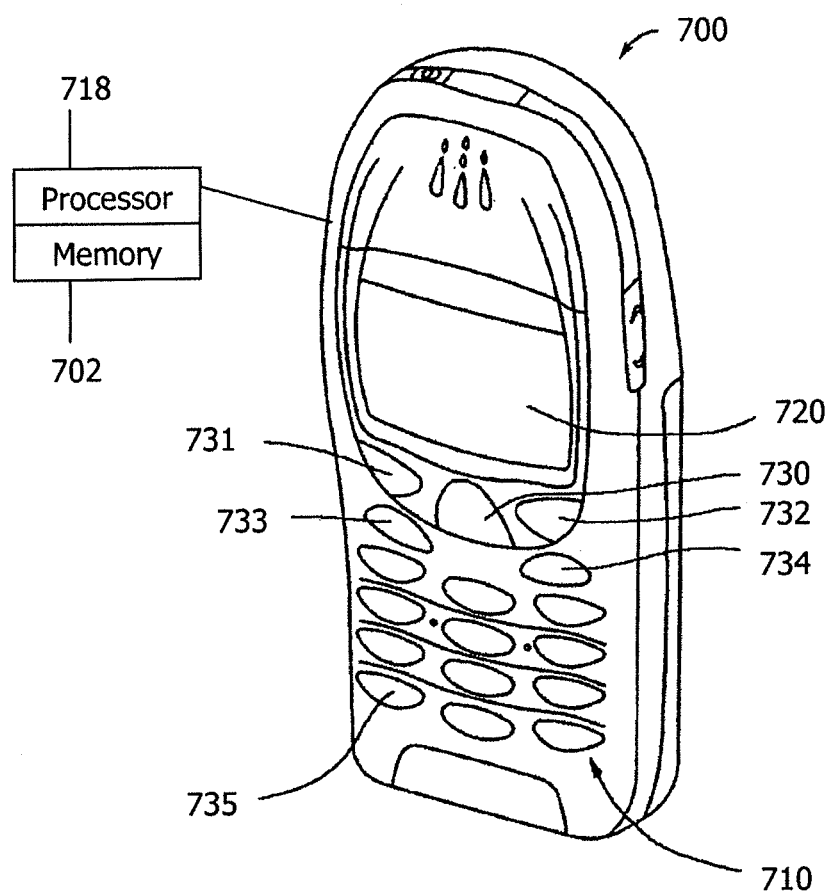
FIGS. 7A and 7B are illustrations of examples of devices that can be used to practice aspects of the disclosed embodiments.
Figure 7B:
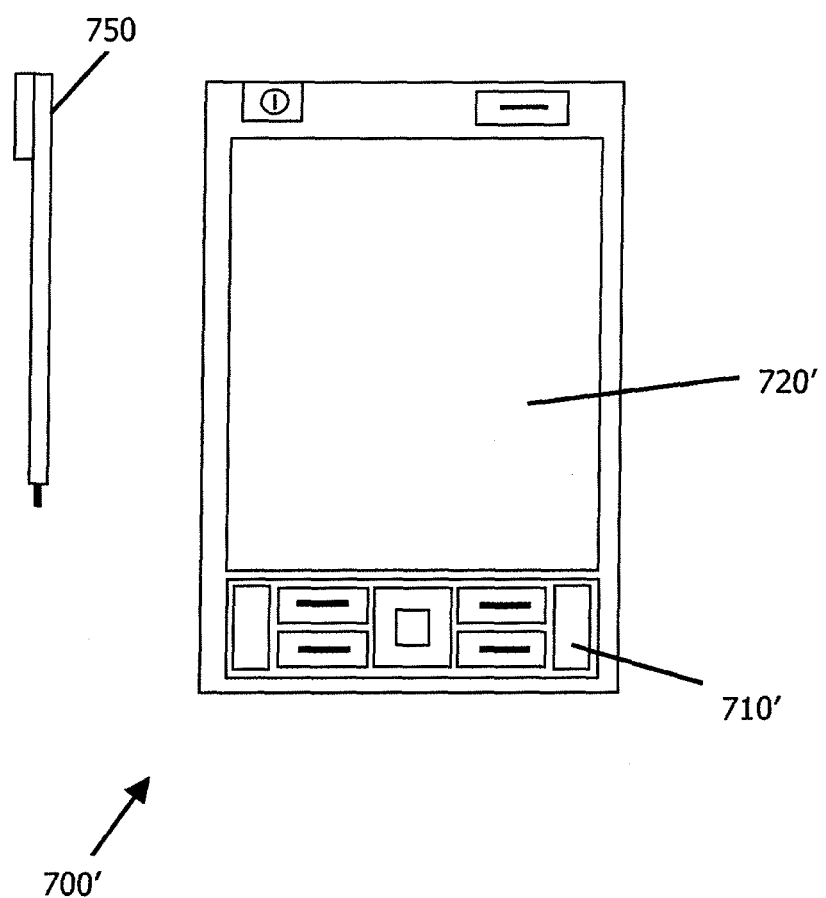

Examples of devices on which aspects of the disclosed embodiments can be practiced are illustrated with respect to FIGS. 7A and 7B. The terminal or mobile communications device 700 may have a keypad 710 and a display 720. The keypad 710 may include any suitable user input devices such as, for example, a multi-function/scroll key 730, soft keys 731, 732, a call key 733, an end call key 734 and alphanumeric keys 735. The display 720 may be any suitable display, such as for example, a touch screen display or graphical user interface. The display may be integral to the device 700 or the display may be a peripheral display connected to the device 700. A pointing device, such as for example, a stylus, pen or simply the user's finger may be used with the display 720. In alternate embodiments any suitable pointing device may be used. In other alternate embodiments, the display may be a conventional display. The device 700 may also include other suitable features such as, for example, a camera, loud speaker, connectivity port or tactile feedback features. The mobile communications device may have a processor 718 connected to the display for processing user inputs and displaying information on the display 720. A memory 702 may be connected to the processor 718 for storing any suitable information and/or applications associated with the mobile communications device 700 such as phone book entries, calendar entries, the presentation content sampler/player described herein, etc.

Figure 8:
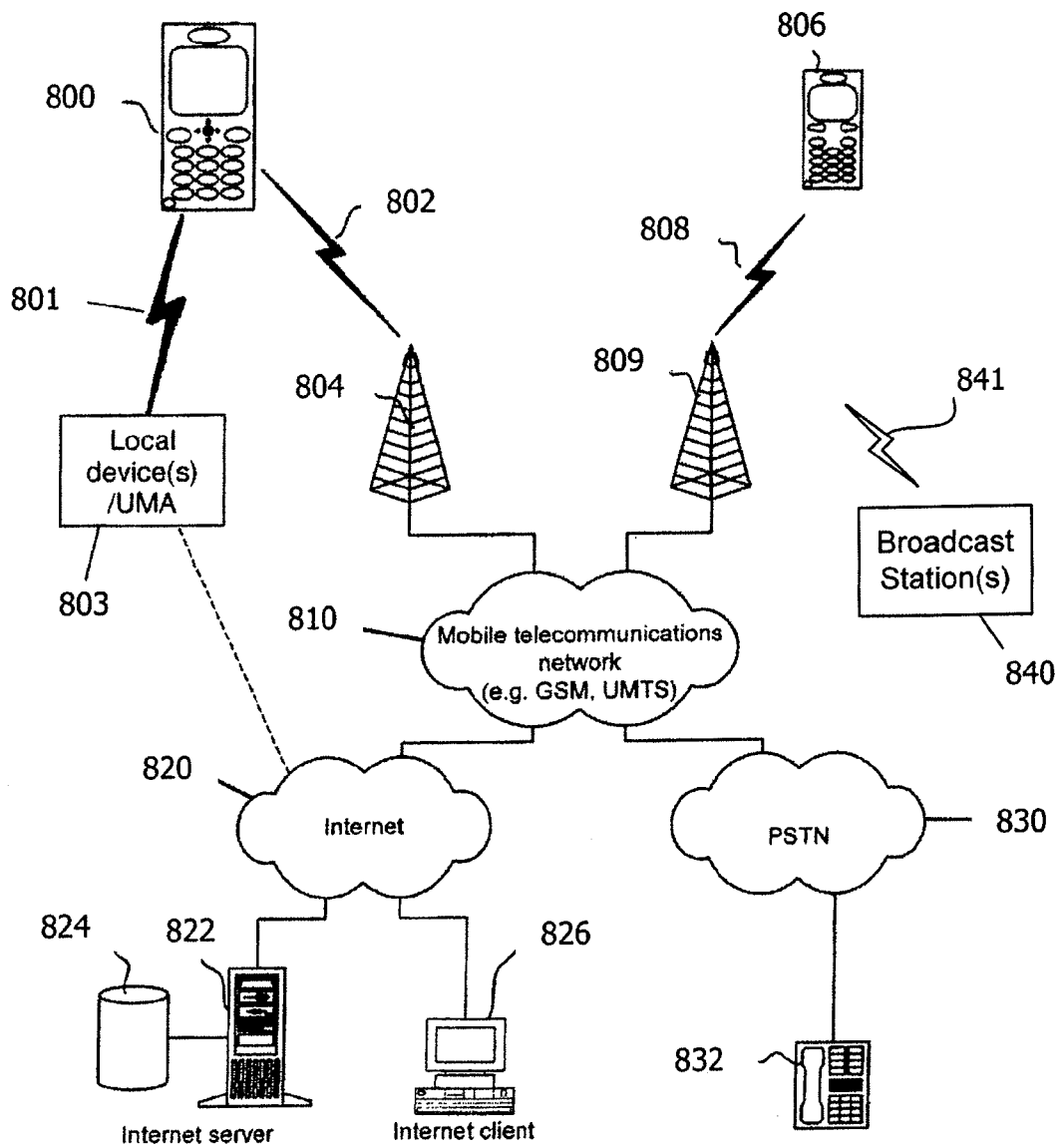
FIG. 8 illustrates a block diagram of an exemplary system incorporating features that may be used to practice aspects of the disclosed embodiments.

In the embodiment where the device 700 comprises a mobile communications device, the device can be adapted to communication in a telecommunication system, such as that shown in FIG. 8. In such a system, various telecommunications services such as cellular voice calls, worldwide web/wireless application protocol (www/wap) browsing, cellular video calls, data calls, facsimile transmissions, music transmissions, still image transmission, video transmissions, electronic message transmissions and electronic commerce may be performed between the mobile terminal 800 and other devices, such as another mobile terminal 806, a line telephone 832, a personal computer 851, an internet server 822, or radio station(s) 840. It is to be noted that for different embodiments of the mobile terminal 800 and in different situations, some of the telecommunications services indicated above may or may not be available. The aspects of the disclosed embodiments are not limited to any particular set of services in this respect.

The mobile terminals 800, 806 may be connected to a mobile telecommunications network 810 through radio frequency (RF) links 802, 808 via base stations 804, 809 and to over the air broadcast stations 840 through link 841. The mobile telecommunications network 810 may be in compliance with any commercially available mobile telecommunications standard such as for example global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 810 may be operatively connected to a wide area network 820, which may be the Internet or a part thereof. An internet server 822 has data storage 824 and is connected to the wide area network 820, as is an Internet client computer 826. The server 822 may host a worldwide web/wireless application protocol server capable of serving worldwide web/wireless application protocol content to the mobile terminal 800.

A public switched telephone network (PSTN) 830 may be connected to the mobile telecommunications network 810 in a familiar manner. Various telephone terminals, including the stationary telephone 832, may be connected to the public switched telephone network 830.

The mobile terminal 800 is also capable of communicating locally via a local link 801 or 851 to one or more local devices 803 or 850. The local links 801 or 851 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 803 can, for example, be various sensors that can communicate measurement values to the mobile terminal 800 over the local link 801. The above examples are not intended to be limiting, and any suitable type of link may be utilized. The local devices 803 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the internet. The mobile terminal 800 may thus have multi-radio capability for connecting wirelessly using mobile communications network 810, wireless local area network or both. Communication with the mobile telecommunications network 810 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the navigation module 122 of FIG. 1 can include a communications module that is configured to interact with the system described with respect to FIG. 8.

Although the above embodiments are described as being implemented on and with a mobile communication device, it will be understood that the disclosed embodiments can be practiced on any suitable device incorporating a display, processor, memory and supporting software or hardware. In one embodiment, the system 100 of FIG. 1 may be for example, a personal digital assistant (PDA) style device 700' illustrated in FIG. 7B. The personal digital assistant 700' may have a keypad 710', a touch screen display 720' and a pointing device 750 for use on the touch screen display 720'. In still other alternate embodiments, the device may be a personal computer, a tablet computer, touch pad device, Internet tablet, a laptop or desktop computer, a mobile terminal, a cellular/mobile phone, a multimedia device, a personal communicator, a television or television set top box, a digital video/versatile disk (DVD) or High Definition player or any other suitable device capable of containing for example a display 114 shown in FIG. 1, and supported electronics such as the processor 718 and memory 702 of FIG. 7.

The user interface 102 of FIG. 1 can also include menu systems 124 in the navigation module 122. The navigation module 122 provides for the control of certain processes of the system 100 including, but not limited to the navigation controls for the presentation content sampler/player described herein. The menu system 124 can provide for the selection of different tools and application options related to the applications or programs running on the system 100. In one embodiment, the menu system 124 may provide for the selection of the presentation content menu 410 or features associated with the presentation content menu 410 such as setting features for the content buffer, identifiers to be included in user defined presentation content menus and the other user settable features described herein. In the embodiments disclosed herein, the navigation module 122 receives certain inputs, such as for example, signals, transmissions, instructions or commands related to the functions of the system 100, such as the presentation content sampler/player. Depending on the inputs, the navigation module interprets the commands and directs the process control 132 to execute the commands accordingly.

Referring again to FIG. 1, the display 114 of the system 100 can comprise any suitable display, such as noted earlier, a touch screen display, proximity screen device or graphical user interface. In one embodiment, the display 114 can be integral to the system 100. In alternate embodiments the display may be a peripheral display connected or coupled to the system 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of an liquid crystal display (LCD) with optional back lighting, such as a thin film transistor (TFT) matrix capable of displaying color images. A touch screen may be used instead of a conventional liquid crystal display.

The system 100 may also include other suitable features such as, for example, a camera, loudspeaker, connectivity port or tactile feedback features.

Figure 9:
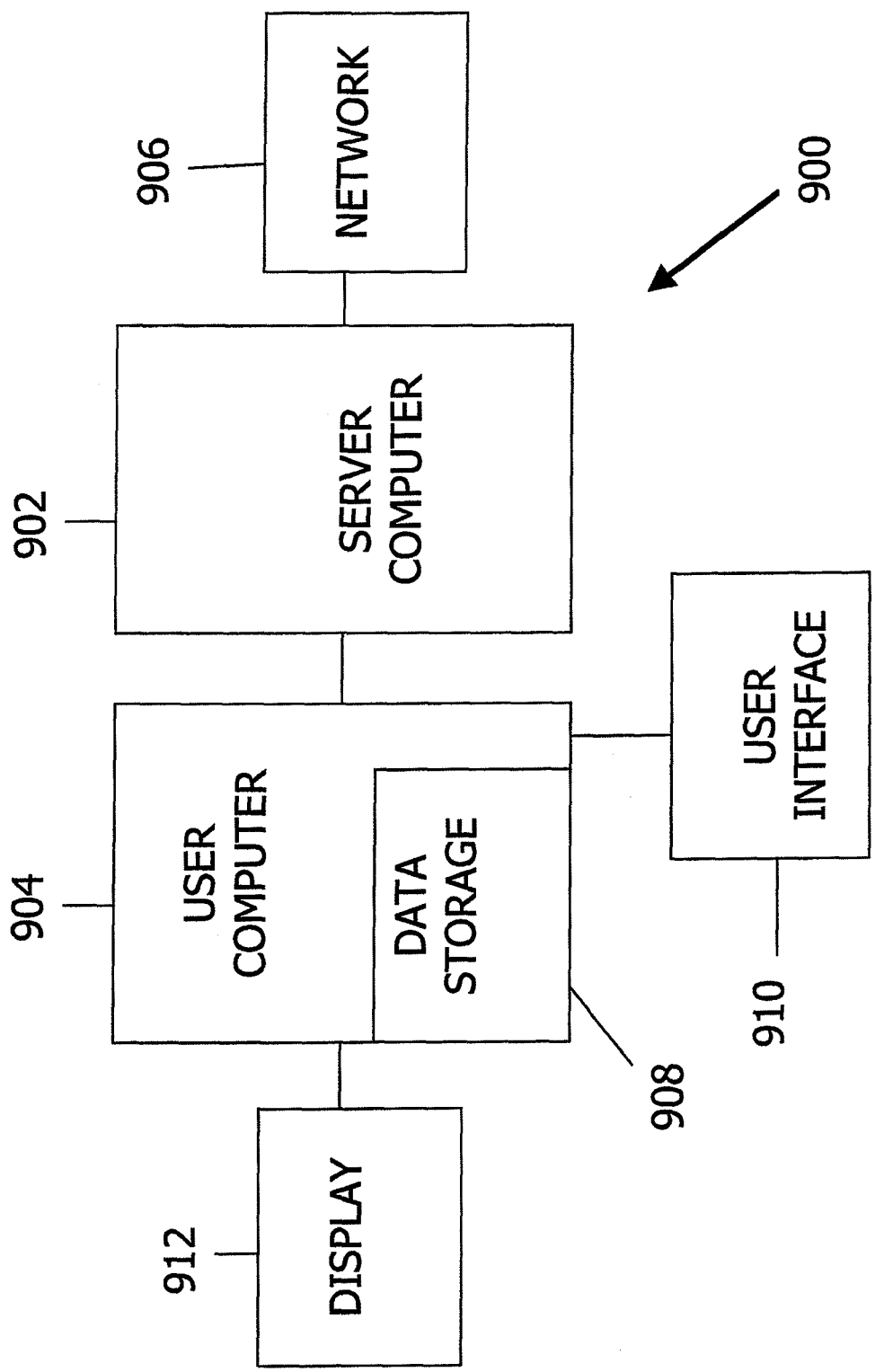
FIG. 9 is a block diagram illustrating the general architecture of an exemplary system in which the exemplary devices of FIGS. 7A and 7B may be used.

The disclosed embodiments may also include software and computer programs incorporating the process steps and instructions described above that are executed in different computers. FIG. 9 is a block diagram of one embodiment of a typical apparatus 900 incorporating features that may be used to practice aspects of the invention. The apparatus 900 can include computer readable program code means for carrying out and executing the process steps described herein. As shown, a computer system 902 may be linked to another computer system 904, such that the computers 902 and 904 are capable of sending information to each other and receiving information from each other. In one embodiment, computer system 902 could include a server computer adapted to communicate with a network 906. Computer systems 902 and 904 can be linked together in any conventional manner including, for example, a modem, wireless, hard wire connection, or fiber optic link. Generally, information can be made available to both computer systems 902 and 904 using a communication protocol typically sent over a communication channel or through a dial-up connection on an integrated services digital network (ISDN) line. Computers 902 and 904 are generally adapted to utilize program storage devices embodying machine-readable program source code, which is adapted to cause the computers 902 and 904 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 902 and 904 may also include a microprocessor for executing stored programs. Computer 902 may include a data storage device 908 on its program storage device for the storage of information and data. The computer program or software incorporating the processes and method steps incorporating aspects of the invention may be stored in one or more computers 902 and 904 on an otherwise conventional program storage device. In one embodiment, computers 902 and 904 may include a user interface 910, and a display interface 912 from which aspects of the invention can be accessed. The user interface 910 and the display interface 912 can be adapted to allow the input of queries and commands to the system, as well as present the results of the commands and queries.

The embodiments described herein allow for substantially live previewing of Internet presentation content and live previewing of over the air presentation content in a playful manner that encourages the discovery of new content. The disclosed embodiments minimize the any listening wait time with respect to, for example, content buffering that may be experienced by a user after selecting, for example, an Internet radio station. The disclosed embodiments also present broadcast station identifiers in a manner that is intuitive in which a user can easily select a desired station without having to scroll through each individual station frequency or long lists of internet based stations.

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
   receiving a selection of a presentation content group;
   in response to receiving the selection of the presentation content group, causing content identifiers corresponding to media content providers to be displayed and automatically pre-buffering content from the media content providers; and
   causing presentation of the pre-buffered content in response to selection of a displayed content identifier.

2. The method of claim 1, wherein the presentation content groups are grouped by one or more of genre, geographical location, and user defined groupings.

3. The method of claim 1, wherein presentation content of the presentation content group comprises live audio or live video presentation content.

4. The method of claim 1, further comprising refreshing the pre-buffered content at predetermined time intervals.

5. The method of claim 1, wherein the media content providers comprise radio stations.

6. The method of claim 5, wherein the radio stations comprise Internet radio stations.

7. The method of claim 6, wherein automatically pre-buffering the content from the media content providers comprises automatically pre-buffering a clip of the content currently being played by one or more of the Internet radio stations.

8. An apparatus comprising:
a processor; and
a memory and a computer program configured to, with the processor, cause the apparatus to:
receive a selection of a presentation content group;
in response to receiving the selection of the presentation content group, cause content identifiers corresponding to media content providers to be displayed and automatically pre-buffer content from the media content providers having a corresponding content identifier; and
cause presentation of the pre-buffered content in response to selection of a displayed content identifier.

9. The apparatus of claim 8, wherein the presentation content groups are grouped by one or more of genre, geographical location, and user defined groupings.

10. The apparatus of claim 8, wherein presentation content of the presentation content group comprises live audio or live video presentation content.

11. The apparatus of claim 8, wherein the memory and the computer program are configured to, with the processor, cause the apparatus to refresh the pre-buffered content at predetermined time intervals.

12. The apparatus of claim 8, wherein the apparatus comprises a mobile communication device.

13. The apparatus of claim 8, wherein the media content providers comprise radio stations.

14. The apparatus of claim 13, wherein the radio stations comprise Internet radio stations.

15. The apparatus of claim 14, wherein the memory and the computer program are configured to, with the processor, cause the apparatus to automatically pre-buffer the content from the media content providers by automatically pre-buffering a clip of the content currently being played by one or more of the Internet radio stations.

16. A computer program product comprising a non-transitory computer readable medium and computer readable program code embodied therein with the computer readable program code comprising program code configured to:
receive a selection of a presentation content group;
in response to receiving the selection of the presentation content group, cause content identifiers corresponding to media content providers to be displayed and automatically pre-buffer content from the media content providers having a corresponding content identifier; and
cause presentation of the pre-buffered content in response to selection of a displayed content identifier.

17. The computer program product of claim 16, wherein presentation content of the presentation content group comprises live audio or live video presentation content.

18. The computer program product of claim 16, wherein the media content providers comprise radio stations.

19. The computer program product of claim 18, wherein the radio stations comprise Internet radio stations.

20. The computer program product of claim 19, wherein the program code configured to automatically pre-buffer the content from the media content providers comprises program code configured to automatically pre-buffer a clip of the content currently being played by one or more of the Internet radio stations.

* * * * *